United States Patent [19]

Grimm et al.

[11] Patent Number: 5,623,128
[45] Date of Patent: Apr. 22, 1997

[54] LOAD CELL WITH MODULAR CALIBRATION COMPONENTS

[75] Inventors: Steven R. Grimm; Richard C. Loshbough, both of Spartanburg, S.C.

[73] Assignee: Mettler-Toledo, Inc., Worthington, Ohio

[21] Appl. No.: 204,057

[22] Filed: Mar. 1, 1994

[51] Int. Cl.$^6$ .............. G01G 19/22; G01G 3/14; G01G 3/08
[52] U.S. Cl. ............... 177/25.13; 177/211; 177/229; 73/862.627; 73/862.623
[58] Field of Search ............... 73/862.627, 862.623; 177/210 R, 211, 225, 226, 229

[56] References Cited

U.S. PATENT DOCUMENTS

| | | | |
|---|---|---|---|
| 4,520,339 | 5/1985 | Utsunomiya | 73/862.627 |
| 4,653,599 | 3/1987 | Johnson | 177/211 |
| 4,718,287 | 1/1988 | Mishliborsky | 73/862.623 |
| 4,747,456 | 5/1988 | Kitagawa et al. | 177/211 |
| 4,804,052 | 2/1989 | Griffen . | |
| 4,815,547 | 3/1989 | Dillon et al. . | |
| 5,076,375 | 12/1991 | Dillon et al. . | |

FOREIGN PATENT DOCUMENTS

| | | | |
|---|---|---|---|
| 1462808 | 1/1977 | United Kingdom . | |
| 2221039 | 1/1990 | United Kingdom | G01D 3/04 |

OTHER PUBLICATIONS

Sensor Developments, Inc.; "Applying EPROM Technology to Transducers Simplifies Instrument Calibration"; Spring 1994; pp. 2,3; Innovations in Force Measurement, Issue 18.

Sensor Developments, Inc.; "Recent Developments –SDI's auto–id system"; 1994; p.2; Company Profile.

*Primary Examiner*—Cassandra C. Spyrou
*Assistant Examiner*—Randy W. Gibson

[57] ABSTRACT

A digital load cell includes an EEPROM that is permanently attached to the counterforce along with a temperature sensor and a plurality of strain gages. The strain gages are mounted on the counterforce in the electrical configuration of a full wheatstone bridge. The EEPROM and bridge are connected to a flexible circuit that is detachably connectable in electrical communication with circuits including a processor and an analog-to-digital converter, which can be mounted permanently on a local circuit board physically separated from the EEPROM. The local circuit board operates in a manner so that the EEPROM can be programmed to store the calibration/correction factors that are to be applied by the processor to the digital weight signals from the analog-to-digital converter. The local circuit board is associated with, and alternatively can be removably attachable to, the counterforce.

14 Claims, 4 Drawing Sheets

LOAD CELL WITH MODULAR CALIBRATION COMPONENTS

BACKGROUND OF THE INVENTION

The present invention relates to load cells.

A load cell includes a counterforce and at least one force transducer such as a strain gage. The counterforce (also known by other terms such as a force-receiver) is configured and disposed to support a load and to deflect in response thereto. The force transducer is mounted on the counterforce and used to generate analog electrical signals that are proportional to the load supported by the counterforce. Typically, the force transducer includes one or more strain gages, which are mounted on the surface of the counterforce so that as the counterforce is stressed and strained by the application of a load, the strain gages produce an analog electrical signal proportional to the load. In a typical load cell, four strain gages are attached to the surface of the counterforce and are electrically connected in a full wheatstone bridge configuration. The analog electrical output of the wheatstone bridge is the output signal of the load cell.

As disclosed in UK Patent Specification No. 1 462 808, the analog output of a load cell is typically coupled to circuitry for converting it into a digital signal and processing the digital signal. This circuitry can also include memory for storing calibration data that is associated with each load cell and can be used to correct the digital signal for such factors as zero and range errors, nonlinearity, hysteresis, temperature, and creep.

As described in U.S. Pat. No. 4,815,547, which is owned by the assignee of the present application and is hereby incorporated herein by this reference, a digital load cell is provided in which a local printed circuit board is attached to the counterforce and encloses an analog-to-digital converter, a microprocessor and memory for storing the calibration and correction characteristics for the load cell. As described in the patent, calibration and correction data (to correct the digital signal for errors caused by factors like creep for example) to be stored in memory on the local circuit board is obtained by subjecting the load cell to known conditions of temperature, load and the like and determining constants and coefficients to be used in the correction algorithms used by the processor. The digital load cell produced as disclosed in the patent is a self-contained modular device that, in case of malfunction, may be replaced with a like device with minimum effort. A disadvantage, however, is that the load cell and/or the complete circuit board may be lost in case of malfunction.

OBJECTS AND SUMMARY OF THE INVENTION

It is a principal object of the present invention to provide a load cell that overcomes the disadvantage discussed above.

Another important object of the present invention is to provide a load cell that is modular with respect to the calibration components forming the cell.

Still another important object of the present invention is to provide a load cell wherein the components that require calibration or correction data are permanently attached to the components that store the calibration or correction data and form a modular unit.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, in the load cell of the present invention, the components that figure in the storage of calibration and/or correction data and the components to which the data pertains, are permanently attached to one another as a modular unit.

In accordance with the present invention, a memory chip such as an electrically erasable programmable read only memory chip (EEPROM) is permanently attached to a counterforce along with the transducer, such as a plurality of strain gages. The EEPROM is electrically connected to a processor, which can be mounted permanently on a local circuit board that contains an analog-to-digital (A/D) converter and the other load cell circuitry. The EEPROM is physically separate from the local circuit board and stores the calibration/correction factors that are to be applied by the processor to the digital signals from the A/D converter. The force transducer is electrically connected in communication with the analog-to-digital converter mounted on the local circuit board. The local circuit board may be removably attachable to the counterforce or may be disposed either locally or remotely from the counterforce. A thin flexible circuit provides electrical connections from the force transducer and the EEPROM to the local circuit board containing the analog-to-digital converter and the other load cell circuitry.

The accompanying drawings, which are incorporated in and constitute a part of this specification, illustrate one embodiment of the invention and, together with the description, serve to explain the principles of the invention.

DETAILED DESCRIPTION OF THE PREFERRED EMBODIMENTS

Reference now will be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description.

Figure 1:
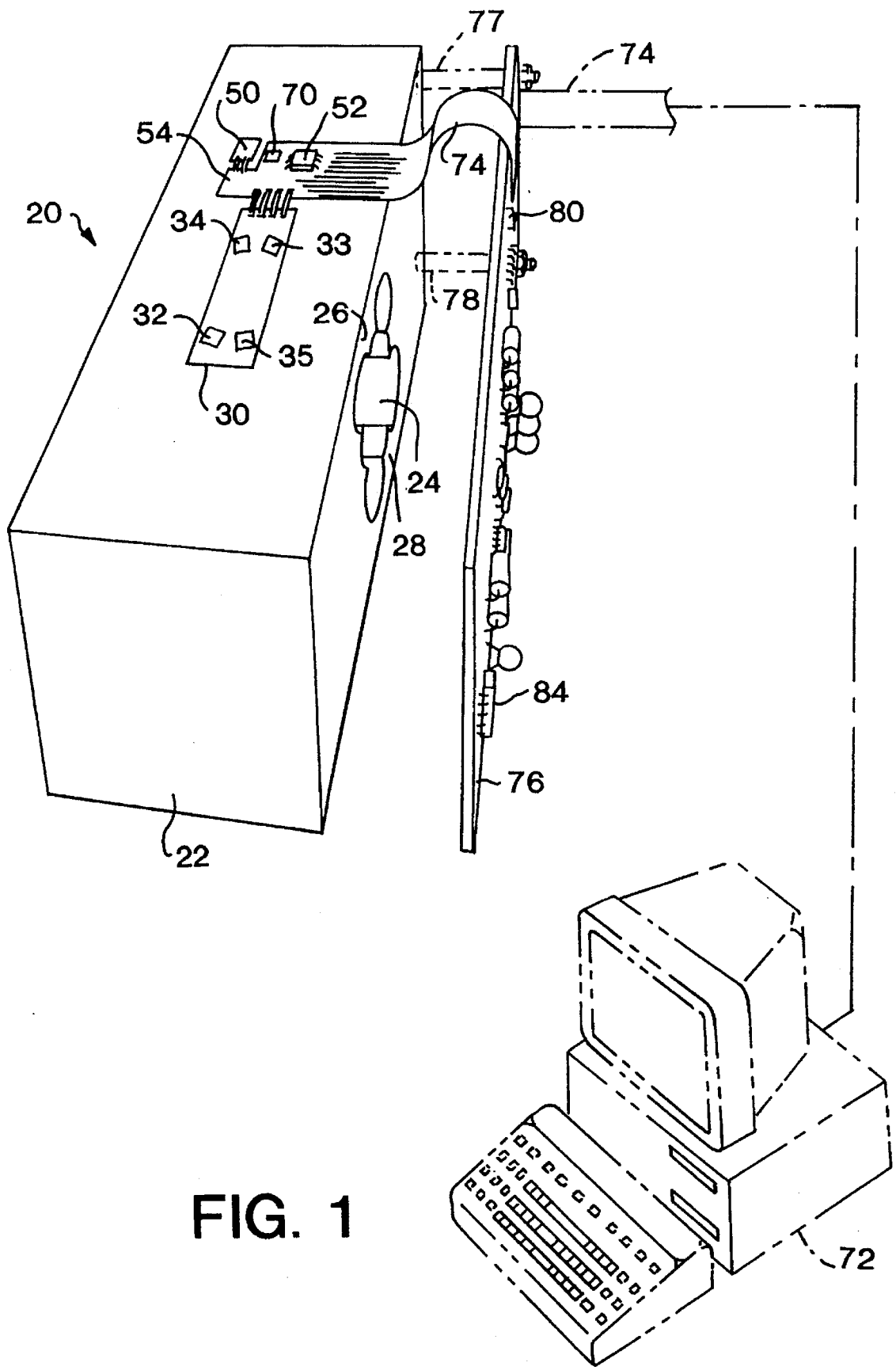
FIG. 1 is an elevated perspective view of a preferred embodiment of a digital load cell according to the present invention and certain collateral features shown in dashed line.

A preferred embodiment of a load cell of the present invention is shown in FIG. 1 and is represented generally by the numeral 20. The embodiment shown in FIG. 1 is a moment insensitive (a.k.a. single moment) configuration, which detects the same load independent of where the load is applied with respect to the location of the strain gages.

The load cell apparatus of the present invention includes a counterforce, which functions to support the load that is to be measured by the load cell. The counterforce is configured to meet the mounting and dimensional specifications of the application in which the load cell is to be used. The material composition and configuration of the counterforce is also determined by the amount of load that is anticipated to be applied to the counterforce. As shown in FIG. 1, a counterforce 22 is provided in the form of a rectangular block of metal such as aluminum or stainless steel. A plurality of holes are drilled transversely through the block to form an opening 24 (shown in dashed line) bounded by an upper beam 26 and a lower beam 28.

In the load cell apparatus of the present invention, a transducer means is provided for producing analog electrical signals representative of force loads that are applied to the counterforce. The transducer means is mounted on the surface of the counterforce. As embodied herein and shown in FIGS. 1 and 2, the transducer means is indicated by the designating numeral 30 and is mounted on the surface of counterforce 22. As shown in greater detail in FIG. 2, an embodiment of the transducer means is provided in the form of four individual strain gages 32, 33, 34, 35 in the form of four electrically resistive elements that are electrically connected in the configuration of a full wheatstone bridge, which is designated in the schematic diagram of FIG. 3 by the designating numeral 36.

Figure 2:
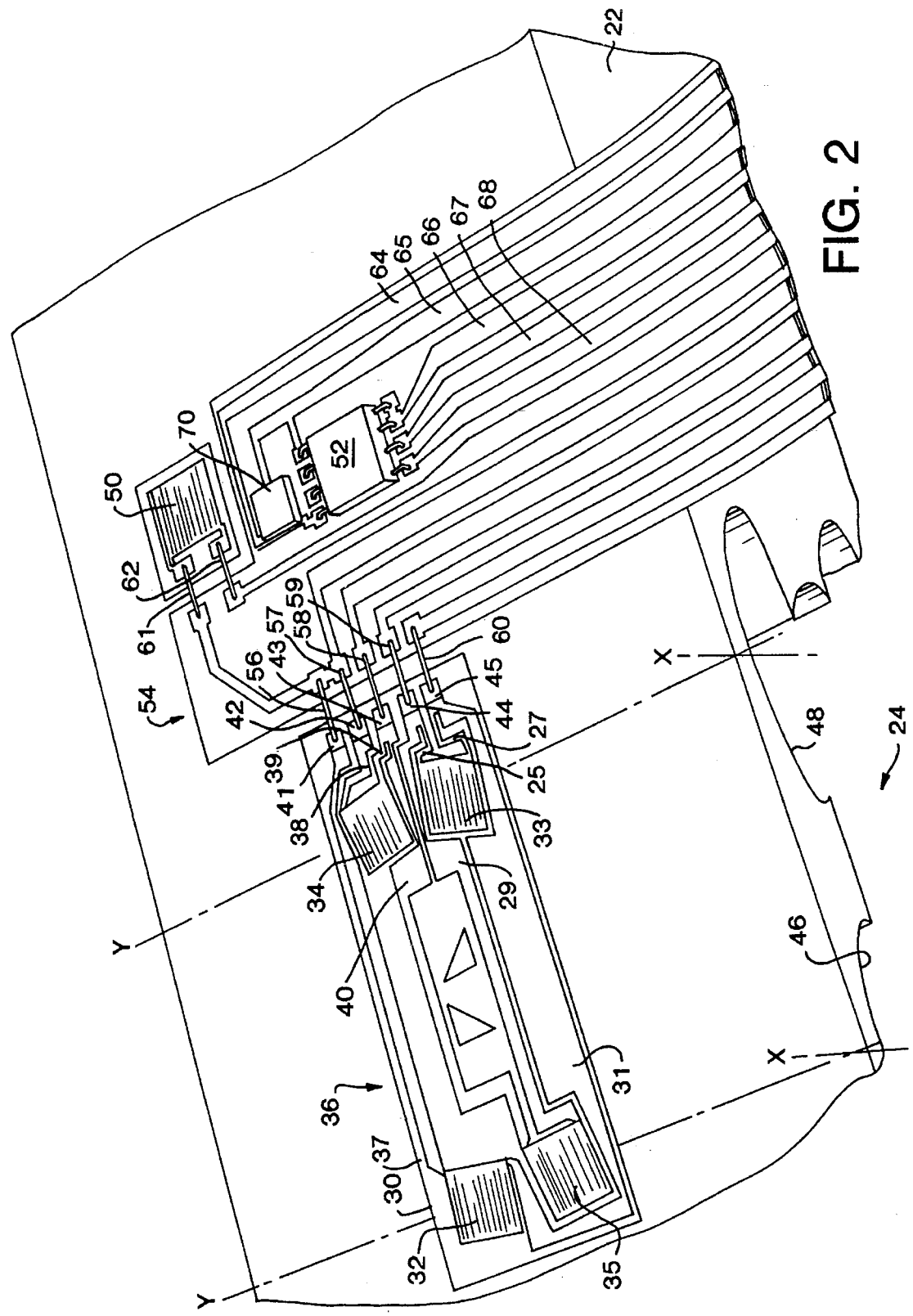
FIG. 2 is a partial elevated perspective view of a portion of the load cell of FIG. 1.

As shown in FIG. 2, the force transducer means is provided in the form of a thin sheet of constantin foil which has been subjected to photolithography to yield four strain gages electrically connected by conducting layers 25, 27, 29, 31, 37, 38, 39, 40 to form full wheatstone bridge 36. The conducting layers end in five terminals 41, 42, 43, 44, 45. As known in the art, constantin has a relatively high electrical resistance so that the resistance value of a very thin foil is reasonably high, while the foil is thin enough so that it can bend. As it bends, it stretches or compresses and accordingly changes its electrical resistance in a highly predictable manner that enables it to function as a force transducer that yields an analog electrical signal proportional to the force load being supported by the counterforce to which the constantin strain gage elements 32, 33, 34, 35 are mounted. Moreover, the electrical resistance of constantin does not change very much with temperature.

As shown in FIG. 2, the force transducer means is attached permanently to the surface of the counterforce. Preferably, the thin sheet of photolithography foil forming the strain gages is attached permanently to the surface of the aluminum block using epoxy which is thermoset by the application of heat and pressure. However, another method of mounting the strain gages permanently to the surface of the counterforce may be used. As shown in FIG. 2, each pair of strain gages 32, 35 and 33, 34 is disposed symmetrically about a dashed line X-Y, which is aligned with the longitudinal centerlines of the upper cylindrical portions 46, 48 of the opening that is disposed beneath that pair of strain gages.

In the load cell of the present invention, a temperature sensor is mounted on the counterforce to sense the temperature of the counterforce. This temperature is used by the processor (described hereafter) to determine correction factors and calibration factors to the digital electrical signals used to represent the load applied to the counterforce. As shown in FIG. 2 for example, a temperature sensor 50 in the form of a nickel resistor is attached permanently to the surface of counterforce 22 using epoxy which is thermoset by the application of heat and pressure. However, another method of mounting the temperature sensor permanently to the surface of the counterforce may be used. Desirably, the temperature sensor is bonded in the same manner and in the same operation as the force transducer means in order to take full advantage of manufacturing efficiencies.

In the load cell apparatus of the present invention, a means is provided for storing data for compensating for physical response factors that are characteristic of the load cell. The data is used to correct errors due to factors such as nonlinearity, hysteresis, creep and temperature variations. As embodied herein and shown in FIGS. 1–3, the compensation data storage means desirably includes a digital data storage device such as a digital memory chip 52. An embodiment of the compensation data storage means is provided in the form of an EEPROM such as a surface mounted 1024 bit serial EEPROM 93C46 available from National Semiconductor, among other vendors. The EEPROM also can be used to store other types of information such as the serial number of the load cell, manufacturing date, the initial zero characteristic of the cell, and the like.

Figure 3:
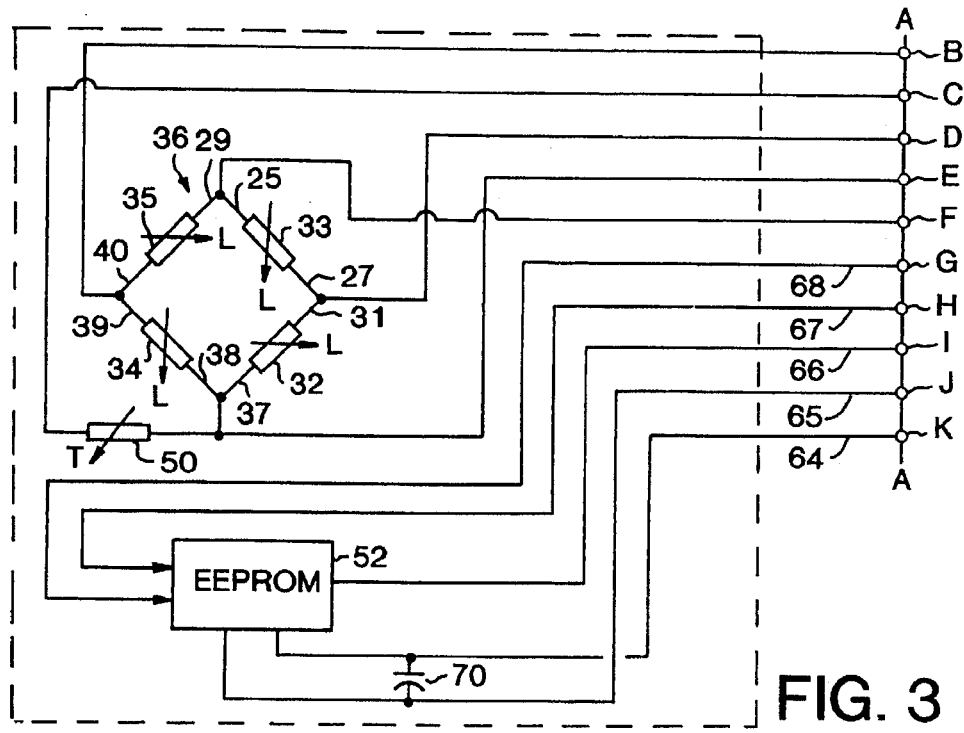
FIG. 3 is an electrical schematic representation of components shown in FIG. 2.

In accordance with the present invention, the compensation data storage means is integrated with the components of the load cell for which the correction data or calibration data is being stored. Preferably, the integration of these components is permanent. As shown in FIGS. 1–3, the strain gages 32, 33, 34, 35 and the counterforce 22, which are the load cell components that require correction data to be applied to the digital signal derived from the force transducer means, are permanently attached to each other. The memory chip 52 forming the compensation data storage means is attached to counterforce 22 so that these three components, the strain gages, the counterforce, and the memory chip, form a modular unit of the load cell. The temperature sensor 50 also is involved in determining the calibration data and correction factors stored in the memory chip, and the temperature sensor also is attached permanently to the counterforce 22. Thus, in the present embodiment, the strain gages, the counterforce, the temperature sensor, and the memory chip can be considered to be the load cell's calibration components.

As embodied herein and shown in FIG. 2, memory chip 52 is electrically connected to terminals that are provided on a flexible circuit which is generally designated by the numeral 54. Flexible circuit 54 is bonded to the same surface of the counterforce 22 as the force transducer means. Desirably, the flexible circuit is bonded in the same manner and in the same operation as the force transducer means and the temperature sensor in order to take full advantage of manufacturing efficiencies.

The flexible circuit is formed in the conventional manner with a backing member to which electrically conducting strips are deposited and terminals are formed for electrically connecting to the components to be interconnected. For example, the flexible circuit can be formed with a polyamide carrier material on which copper tracks are deposited in a conventional photolithography process. The carrier and the copper tracks are then encapsulated with an additional sheet of polyamide. In those areas where the digital memory chip is to be applied and where terminals are to be exposed, a solder mask is applied over the exposed track to protect the copper tracks in these areas during the heat process in which the flexible circuit is bonded to the counterforce.

After the heat process that is used to apply the flexible circuit 54, the temperature sensor 50, and the force transducer means 30 to the counterforce, it is desirable to clean their exposed terminal surfaces to remove oxide layers generated during the heat process. This can be accomplished in the conventional manner and forms no part of the present invention.

As shown in FIG. 2, temperature sensor 50 is disposed adjacent flexible circuit 54 and is schematically shown in its electrical configuration in FIG. 3 with the arrow and the "T" indicating its temperature dependent electrical resistance. The arrows and the "L" through each strain gage 32, 33, 34, 35 in FIG. 3 is intended to indicate their load dependent electrical resistance. As shown in FIGS. 1–3, the wheatstone bridge 36 is disposed adjacent the flexible circuit 54 as well as being electrically connected to the flexible circuit. As shown in FIG. 2, electrical leads 56, 57, 58, 59, 60 are bonded between the terminals on flexible circuit 54 and the force transducing means 30. Electrical leads 61 and 62 are bonded between terminals on the flexible circuit and the temperature sensor. Preferably, these leads are formed of aluminum wire and are bonded ultrasonically using conventionally available machinery. The labor intensive procedure of attaching lead wires of the strain gages and the temperature sensor to the local circuit board (described below) is avoided, as these functions can be performed in a conventional manner by machinery that bonds the lead wires. However, the lead wires could be bonded by other means such as with electrically conducting adhesives or by soldering by hand or machine.

As shown in FIGS. 2 and 3, the EEPROM is electrically connected to five leads 64, 65, 66, 67, 68, and a filtering capacitor 70 is provided between the ground lead 65 and the power supply lead 64 to the EEPROM. Also connected to the EEPROM is an enable lead 68 by which the EEPROM can be accessed for storage or retrieval of information, a clock lead 67 by which the EEPROM can receive an electrical signal which permits the EEPROM to receive and store digital information, and a data lead 66 by which the EEPROM can transfer data to/from another digital device such as a processor.

At this point in the manufacturing and assembly process of the load cell of the present invention, the counterforce, temperature sensor and strain gages are desirably subjected to a variety of load and operating conditions. As shown schematically in FIG. 1, testing instrumentation 72 (dashed line) is connected to the leads in the ribbon portion 74 (dashed line) of the flexible circuit 54 and obtains digital load representations under the conditions to which the counterforce and the strain gages mounted thereon are subjected. These load representations are used to determine the correction factors for the particular counterforce and strain gages of this modular component of the load cell. The correction factors and calibration data that are determined at this point, are stored in the digital data storage device 52 for use in operating the load cell. This calibration step of the manufacturing process occurs after the force transducer means, the temperature sensor, and the flexible circuit with the memory chip have been permanently bonded onto the counterforce. However, this calibration step can be performed with or without the printed circuit board 76 (described below) forming the digital local circuit means being connected to the flexible circuit. In the absence of the local board 76, the calibration equipment would include appropriate circuitry to read the signal from the counterforce undergoing the calibration. The absence of a local printed circuit board permits the calibration procedure to be performed in less space or permits a greater number of counterforce elements to be calibrated at the same time in a given space. The absence of the local digital printed circuit board avoids the need to handle this board and possibly damage it in the handling process.

The principle of permanently integrating with the counterforce and the strain gages, the digital memory chip that is used to store the correction factors and/or calibration data that constitute the unique signature of the counterforce and the strain gages, can be applied to load cells of other configurations including load cells having differently configured counterforces than the counterforce 22 shown in FIG. 1. The principle also can be applied to other configurations of the force transducer means than the four strain gage configuration of FIGS. 1 and 2.

Figure 4:
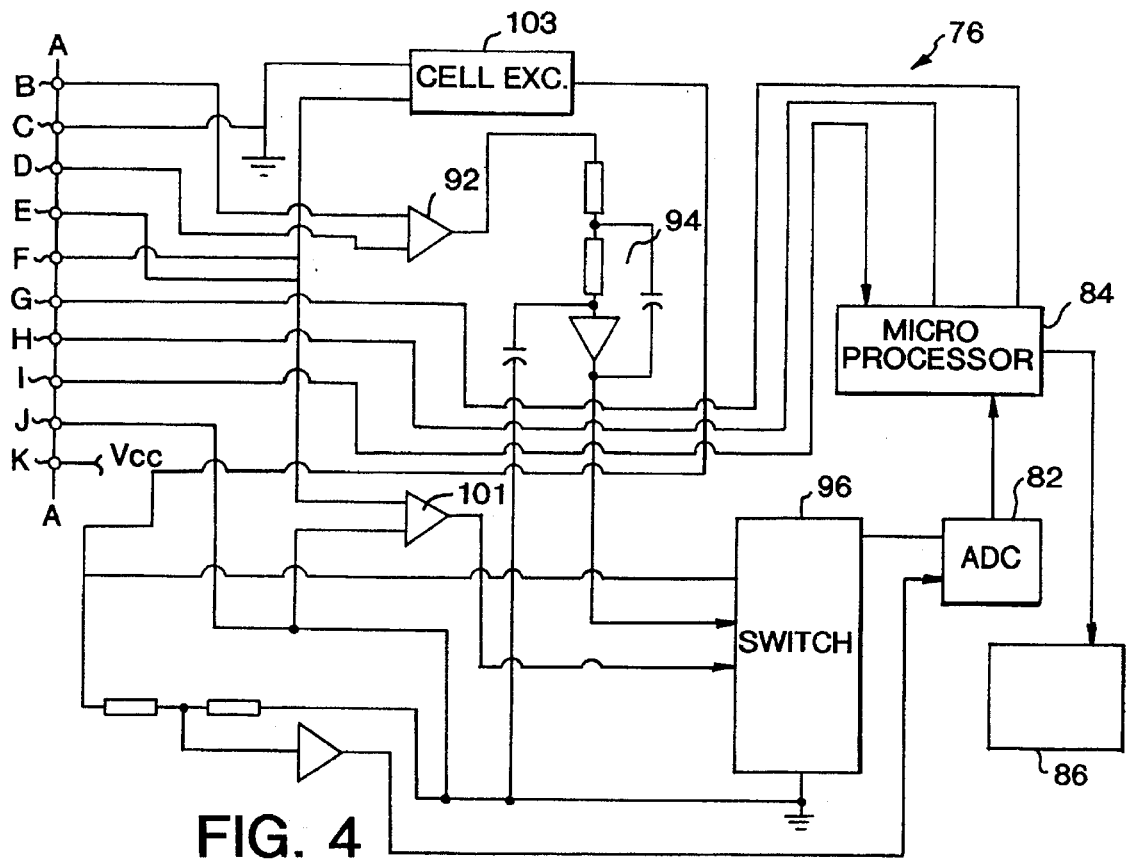
FIG. 4 is an electrical schematic representation of selected components of the embodiment of FIG. 1.

In the load cell of the present invention, a local circuit means is provided that is capable of electrically responding to external control. The local circuit means desirably includes a means for receiving and converting analog electrical signals representative of loads applied to the counterforce into digital electrical signals representative of loads applied to the counterforce. The local circuit means is mounted remotely from and removably connected in electrical communication with, the compensation data storage means mounted on the counterforce via flexible circuit 54. An embodiment of the local circuit means is schematically illustrated in FIG. 4. As shown in FIG. 1, the local circuit means may be provided in the form of a rigid circuit board 76 which is associated with the counterforce 22. Alternatively, as shown in FIG. 1, the local circuit means may be provided on a rigid circuit board 76 which is detachably attached to the counterforce via a plurality of screw mounts (dashed lines) 77, 78.

As shown in FIGS. 2 and 3, the wheatstone bridge 36, temperature sensor 50, flexible circuit 54, and memory chip 52 are electrically connected to the local circuit means shown in FIGS. 1 and 4 at the interface A—A shown in FIGS. 3 and 4. Each of the terminals of the ten electrically conducting paths of flexible circuit 54 are provided with its own designating letter B through K, which are the same in each of FIGS. 3 and 4.

As shown in FIG. 1, the local circuit means is removably attachable to the flexible circuit by means of the flexible ribbon lead portion 74 (solid line) of the flexible circuit 54 and the connector 80 mounted on the printed circuit board 76 forming the local circuit means. The local circuit means includes a two channel analog-to-digital converter 82 that is electrically connected in communication with the output of the wheatstone bridge 36 formed by the strain gages 32, 33, 34, 35 and with the temperature sensor 50. The local circuit means also can include an electronic processor 84 such as an Intel 8051 processor. As shown in FIG. 1, the processor 84 can be permanently mounted on the local circuit board 76. Alternatively, as shown schematically in FIGS. 4 and 5, the processor can be connected electrically in communication with the local circuit board from a remote circuit board 86. As schematically shown in FIG. 5, remote circuit 86 may be configured to control the local circuit means as well as the calculation and display of information that is processed from one or more load cells 200 in a particular application such as a grocery store scale, a postage scale, or another device employing one or more load cells according to the present invention.

Referring now to FIGS. 3 and 4, the electrical circuit of the digital load cell 20 of FIGS. 1 and 2 includes strain gauges 32, 33, 34 and 35 connected in the electrical bridge circuit 36. The bridge circuit 36 provides an analog weight signal to a preamplifier 92 via terminals B and D. The weight signal from preamplifier 92 is coupled through an analog filter 94 to one input of an analog switch 96. The output of switch 96 is connected to the input of double channel analog-to-digital (A/D) converter 82. As shown in FIG. 3, nickel resistor 50 is connected in series with bridge circuit 36. As shown schematically in FIGS. 3 and 4, nickel resistor 50 provides a signal via terminals E and J through a preamplifier 101 to another input of analog switch 96. Memory chip 52 is powered via terminal K by a constant voltage ($V_{cc}$) power source. Excitation is provided to bridge circuit 36 by a power supply 103 which also provides a known reference voltage through analog switch 96 to two channel A/D converter 82. The output of A/D converter 82 is connected to processor 84. Processor 84 controls the operation of analog switch 96 to cause analog weight signals from bridge 36 and temperature indicating signals from nickel resistor 50 to be converted to digital form by A/D converter 82 and transmitted to processor 84. However, other configurations for the local circuit means of load cell 20 may be used in the present invention provided that the local circuit means is configured so that the digital calibration data storage means is only detachably connected in communication with the local circuit means.

By providing the components needing correction factors in an integrated modular unit that includes the memory chip 52 in which the correction factors are to be stored, the apparatus of the present invention enjoys several distinct advantages over otherwise similar digital load cells. The local printed circuit boards 76 can be serviced in the field by relatively unskilled technicians. If defective, the boards 76 can be detached from the counterforce 22 and strain gages 32, 33, 34, 35 and replaced without having to recalibrate the counterforce and strain gages and obtain all of the calibration data to be restored in the memory chip 52 provided for this purpose in the load cell. Similarly, if the counterforce or strain gages are to be replaced, the flexible circuit 54 mounted on counterforce 22 can be detached from the local printed circuit board 76 and the counterforce replaced with a new counterforce 22 that is integrated in a module including the digital memory chip 52 storing the calibration data for the new counterforce and the strain gages mounted on the new counterforce. This permits the counterforce and strain gages to be replaced in the field. Each of these procedures avoids having to ship the weighing device and/or a load cell comprising this weighing device, back to the factory, which may be located on another continent from the customer's location. This reduces the repair turnaround time for the customer, and shipping costs also are saved. This is especially true since the counterforce weighs far less than the weighing device in which it is a component. This modular serviceability reduces the number of circuit boards that must be discarded and thus avoids problems with recycling or waste disposal.

Figure 5:
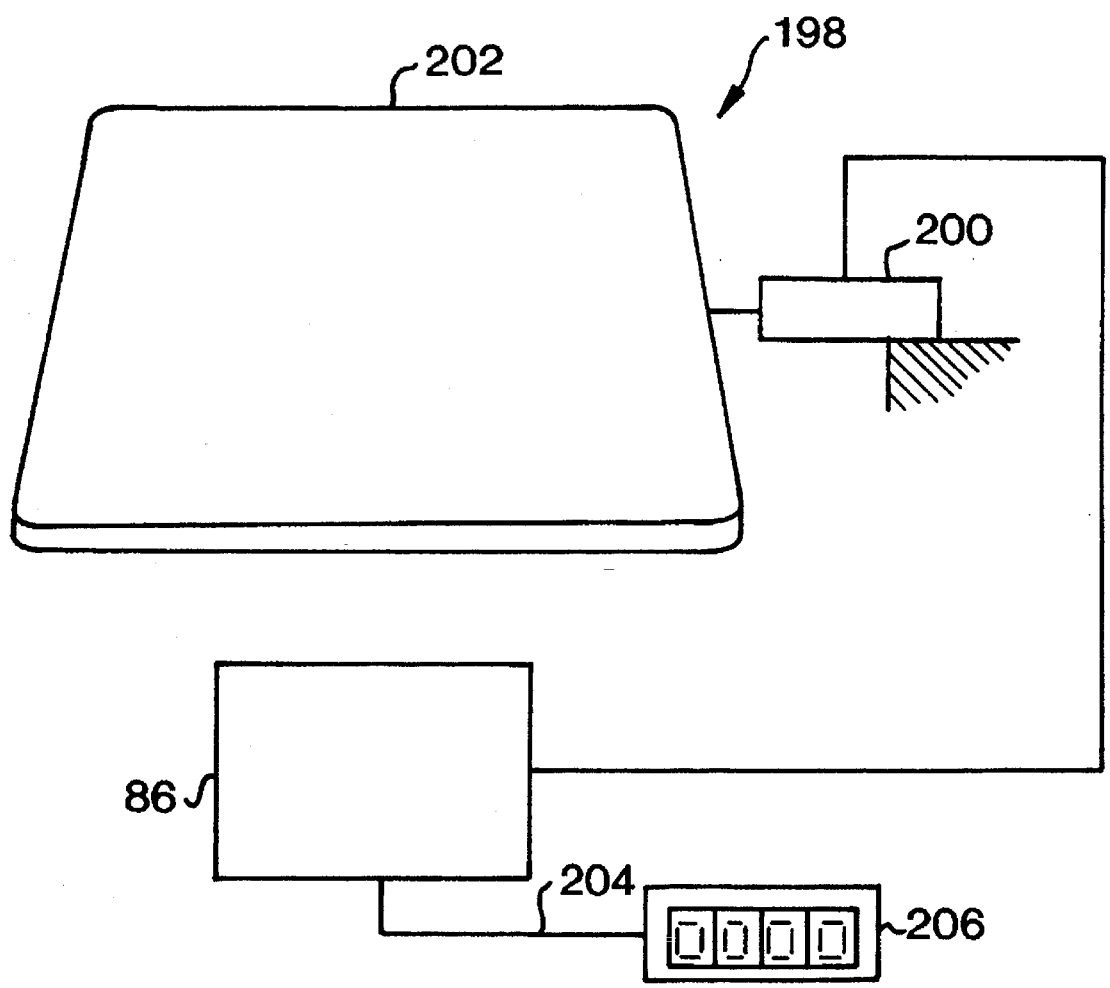
FIG. 5 is a schematic representation of a weighing apparatus including an embodiment of a digital load cell according to the present invention.

FIG. 5 schematically illustrates a weighing apparatus 198 employing at least one load cell 200 in accordance with the present invention. Load cell 200 includes a counterforce, a temperature sensor bonded to the counterforce, a transducer means bonded to the counterforce, a flexible circuit bonded to the counterforce, a compensation data storage means mounted on the flexible circuit, and a local circuit means associated with the counterforce. The compensation data storage means is integrated with the components of the load cell for which the correction data or calibration data is being stored. The compensation data storage means stores correction/calibration data for the counterforce and the transducer means. The local circuit means includes a means for producing digital representations of loads applied to the counterforce and, if desired, a means responsive to external interrogations for transmitting these digital representations. The compensation data storage means is not permanently integrated physically with the local circuit means, which is removably connectable in electrical communication with the compensation data storage means.

As schematically shown in FIG. 5, the weighing apparatus also includes a load receiving means in the form of a rigid platform 202 that is supported by load cell 200. The weighing apparatus also can include a means for processing the digital representations from a plurality of load cells 200 to produce a digital representation of the total weight supported on the load receiving means. As shown in FIG. 5, such processing means can be provided in the form of a remote circuit board 86, which can include a microprocessor and is electrically connected via a lead 204 to control a digital display 206 which presents the digital representation of the total weight on the platform.

What is claimed is:

1. A digital load cell comprising:

a counterforce configured to be disposed to receive a load applied to the load cell;

a transducer means for producing analog representations of loads applied to said counterforce, said transducer means being mounted on said counterforce;

local circuit means removably affixed to said counterforce, including means for receiving and converting analog representations into digital representations of loads applied to the digital load cell, said local circuit means including means for receiving and addling digital correction factors to said digital representations;

means for storing digital correction factors for compensating for physical response factors characteristic of at least one of said counterforce and said transducer means;

said storage means being permanently affixed to said counterforce and spaced apart from said local circuit means; and connector means removably connecting said storage means to said local circuit means for transmission of digital signals therebetween.

2. An apparatus as in claim 1, wherein said storage means is bonded to said counterforce.

3. An apparatus as in claim 1, wherein said connector means comprises a flexible circuit.

4. An apparatus as in claim 3, wherein said flexible circuit is bonded to said counterforce and permanently connected in electrical communication with said storage means.

5. An apparatus as in claim 1, wherein said storage means includes an EEPROM.

6. An apparatus as in claim 3, wherein said flexible circuit is bonded to said counterforce, wherein said storage means includes an EEPROM, wherein said EEPROM is electrically mounted to said flexible circuit, wherein said transducer means is connected in a wheatstone bridge disposed adjacent said flexible circuit and electrically connected to said flexible circuit.

7. An apparatus as in claim 6, further comprising a temperature sensor bonded to said counterforce and electrically connected to said flexible circuit.

8. An apparatus as in claim 7, wherein said flexible circuit is configured to be detachably connected in electrical communication with the local circuit means.

9. An apparatus as in claim 1, wherein:

said connector means includes a flexible circuit bonded to said counterforce;

wherein said transducer means includes four resistive strain gages electrically connected to said flexible circuit in a configuration forming a full wheatstone bridge; and wherein said storage means includes an EEPROM, said EEPROM forming a component of said flexible circuit.

10. An apparatus as in claim 9, further comprising a temperature sensor electrically connected to said flexible circuit.

11. An apparatus as in claim 1, wherein said transducer means is detachably connected in electrical communication with said local circuit means.

12. Weighing apparatus comprising:

at least one load cell, said at least one load cell including a counterforce, transducer means mounted on said counterforce, local circuit means removably affixed to said counterforce, said local circuit means including means for producing digital representations of loads applied to said counterforce, means for applying at least one correction factor to said digital representations and means for transmitting said corrected digital representations, said at least one load cell further including means for storing digital correction factors for compensating for physical response characteristics of at least one of said counterforce and said transducer means, said storage means being permanently affixed to said counterforce and spaced apart from said local circuit means, and means removably connecting said storage means to said local circuit means;

load receiving means supported at least in part by said at least one load cell; and means for using said corrected digital representations from each said load cell to produce digital representations of the total weight on said load receiving means.

13. A method of making a modular digital load cell including a counterforce and digital local circuit means electrically associated with the counterforce for providing corrected digital representations of loads applied to the counterforce, the method comprising the steps of:

removably affixing said local circuit means to said counterforce;

permanently bonding a force transducer means on the counterforce for providing analog load representations to the digital local circuit means;

permanently bonding a digital data storage device on the counterforce and spaced apart from said local circuit means;

electrically connecting detachable circuit means from said transducer means and said storage device to said local circuit means;

subjecting said counterforce to a variety of load and operating conditions and obtaining digital load representations under said conditions;

utilizing said load representations to determine digital correction factors for said load cell; and storing said correction factors in said digital data storage device for use in operation of said load cell.

14. An apparatus as in claim 1, wherein said local circuit means is responsive to external control.

\* \* \* \* \*